Apr. 10, 1923.

E. E. JOHNS

ADJUSTABLE BEARING

Filed Dec. 28, 1920

1,451,224

Witness

Inventor
E. E. Johns.
By Geo. F. Kimmel,
Attorney

Patented Apr. 10, 1923.

1,451,224

UNITED STATES PATENT OFFICE.

ELVY E. JOHNS, OF HEPPNER, OREGON.

ADJUSTABLE BEARING.

Application filed December 22, 1920. Serial No. 433,605.

*To all whom it may concern:*

Be it known that I, ELVY E. JOHNS, a citizen of the United States, residing at Heppner, in the county of Morrow and State of Oregon, have invented certain new and useful Improvements in an Adjustable Bearing, of which the following is a specification.

This invention has for its object to provide an improved take-up device for application to the connecting bolts between adjustable bearing parts for effecting automatic adjustment of the latter to compensate for wear and consequently maintain snug fit of the bearing upon the part journaled therein.

A further object is the provision of a spring shim interposed between the relatively adjustable bearing parts and acting in opposition to the take-up device designed to present a degree of resistance thereto to prevent exertion of excessive pressure upon the rotatable member and consequent undue resistence to its rotary movement.

A more specific object of the invention is the provision of an improved type of nut composed of relatively stationary and rotatable parts connected by a coiled spring, the tension of which latter is utilized to normally tend to advance the rotatable part upon the screw threads of the bolt.

With these and other objects in view, the invention consists in certain novel features of construction as hereinafter shown and described and specifically pointed out in the claims.

Figure 1:
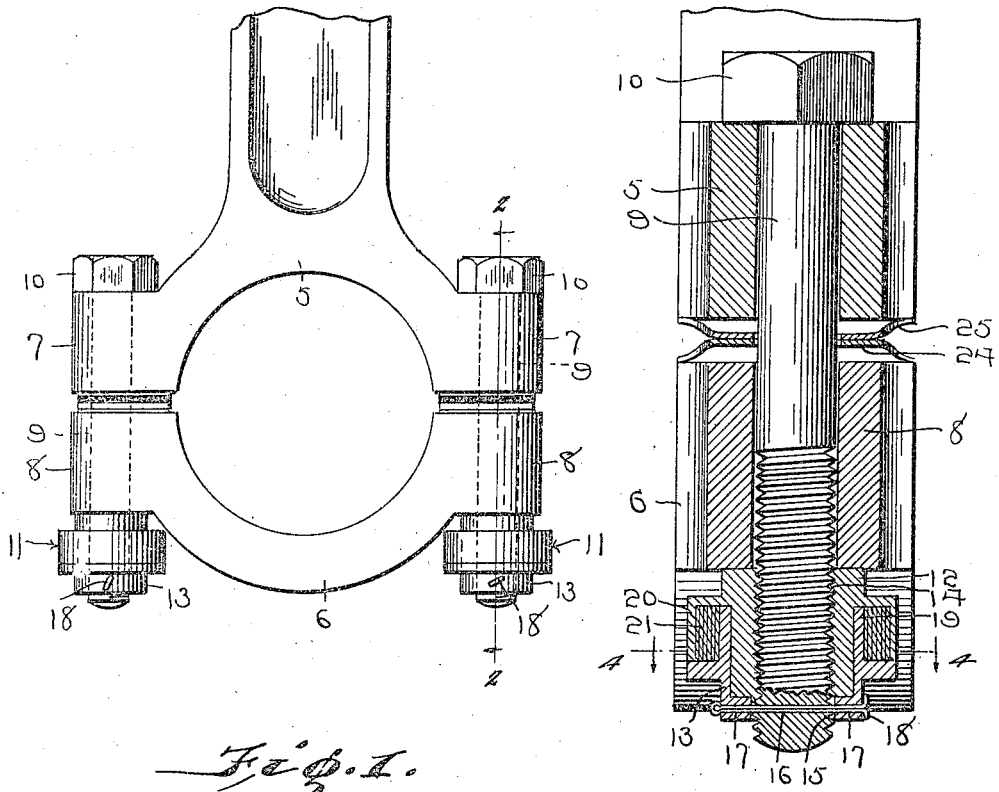
Figure 1 represents a side elevation of a well known type of bearing illustrating the invention applied to use thereon.
Figure 2:
Fig. 2 is an enlarged sectional view through one of the connecting bolts between the parts of the bearing, taken on the line 2—2 of Fig. 1.
Figure 3:
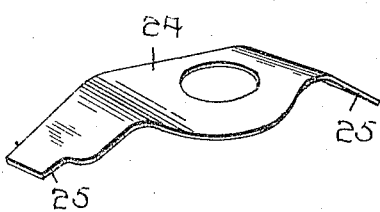
Fig. 3 represents a perspective view of one of the shims.
Figure 4:
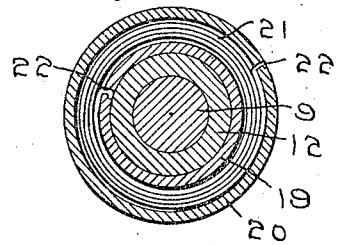
Fig. 4 is an enlarged transverse sectional view on the line 4—4 of Fig. 2.

Referring to the drawing in detail wherein similar reference numerals designate corresponding parts throughout the several views, the numerals 5 and 6 indicate the superposed bearing parts carrying the usual apertured ears 7 and 8, respectively in which are received the adjusting bolts 9. Certain ends of the bolts 9 are provided with integral heads 10 for abutment with the bearing ears 7 whereas nuts designated generally by the numerals 11 are adjustably applied to the oppositely threaded extremities of the bolts for effecting the desired adjustment of the bearing parts 5 and 6.

According to the present invention, the automatic take-up device for the adjustable bearing parts 5 and 6 is embodied in each of the nuts 11, the latter being formed in two sections designated by the numerals 12 and 13. The part 12 is provided with a longitudinal threaded bore 14 adapted to fit the external screw threads of the bolt 9 whereas the part 13 of the nut is provided with an aperture 15 of such size as to slidably receive the threaded extremity of the bolt. The body of the nut part or section 13 is provided with apertures 17 movable into registration with a diametrical aperture 16 formed in the terminal of the bolt 9 so as to receive a pin or key 18 by which the nut part 13 is rigidly locked against rotary movement upon the bolt.

The body of the nut part 12 is of cylindrical form and is telescopically received in a circular flange 19 formed on the nut section 13. A circular flange 20 is formed on the threaded nut section 12 and is disposed in concentrically spaced relation to the flange 19 of the section 13 thereby providing a circular chamber receiving a coil spring 21 having angular extremities 22 anchored in apertures formed in the flanges 19 and 20. A pair of spring shims 24 is arranged on each bolt 19 between the apertured ears 7 and 8 of the adjustable bearing members and the opposite extremities of the shims of each pair are bent oppositely as at 25 and bear against the adjacent faces of the ears 7 and 8. The shims are preferably constructed of spring metal and, due to their inherent resiliency, normally tend to separate the parts 5 and 6 of the bearing.

In use, the parts 5 and 6 of the bearing are applied to a shaft or the like and subsequent to inserting pairs of the spring shims 24 between the ears 7 and 8, the bolts 9 are passed through the apertures in said ears. The threaded nut sections 12 are subsequently applied to the threaded extremities of the bolts 9 and advanced thereon until the bearing parts 5 and 6 are brought into such position as to snugly fit the shaft journaled therein. Prior to the insertion of the pin 18, the nut section 13 is turned upon each bolt 9 until the spring 21 is so tensioned as to normally tend to rotate the nut section 12 in a direction to advance it upon the threads of the bolt 9 and consequently maintain the spring shims 24 under compression. Owing to the tendency of the nut sections to turn under the influence of the springs 21, loose movement of the shaft relative to the bearing, incident to wear of the parts, is gradually compensated for thus maintaining the bearing in snug fitting relation upon the shaft. As will be understood, the tension of the springs 21 is greater than that exerted by the spring shims 24 whereas the tension of the latter is utilized to oppose advancement of the nuts 11 and consequently prevent exertion and excessive pressure upon the bearing parts 5 and 6.

As an instance of specific use of the bearings herein described, the same may be applied to the crank shafts of internal combustion engines, when the automatic adjustment of the devices will be effected by the constant vibration of the firing order of the engine, such vibration being set up by the pounding pressure of combustion of the successive fuel charges in the cylinders thereof. The intermittent pounding of the exploded charges causes a corresponding compression of the shims, and consequently, a tightening action of the nut 12 against the lower bearing member 6, with the result that the wear of both bearing members 5 and 6 is continually compensated for throughout the life of the parts, In this bearing construction, the pressure to be exerted by the shims 24 and 25 is approximately twice as great as that exerted on the nut 12 by the coil spring 21, so that the nut 12 is normally held locked against turning movement under the tension of the spring 21, and, by so locking this nut 12, there can be no binding or friction creating pressure of the bearing members 5 and 6 on the shaft at any time, and any tendency toward a binding between the bearing parts, even during the turning movement of the nut 12, is prevented by the immediate expansion of the shims, following their moment of compression. In actual practice, it has been found that the adjustment of the device is so fine, that the only pressure exerted on the shaft is that of the weight of the upper portion of the bearings.

What I claim is:

1. An adjustable bearing comprising a pair of opposed relatively movable bearing parts, a pair of bolts connecting said parts, two pair of resilient elements interposed between said bearing parts and normally tending to separate the latter, the elements of each pair being in abutting engagement and oppositely disposed with respect to each other, said bolts extending through said elements, a sectional nut fitted upon each of said bolts and a resilient element inclosed by the sections of the nut normally tending to advance one of the sections to draw said parts together.

2. In combination, relatively movable bearing parts, bolts connecting said parts, oppositely disposed resilient elements interposed between said bearing parts and permanently tending to separate the latter, sectional nuts fitted on said bolts, and resilient means mounted in each of the nuts for normally tending to advance one section of its respective nut to draw the bearing parts together, said resilient means being of greater tension than said resilient elements.

3. In combination, relatively movable bearing parts, bolts connecting said parts, oppositely disposed resilient elements interposed between said bearing parts and permanently tending to separate the latter, sectional nuts fitted on said bolts, and means mounted in and inclosed by each of the nuts for normally tending to advance one section of its respective nut to draw the bearing parts together, the other section of each of said nuts being stationary and fixedly secured to its respective bolt.

4. In combination, a pair of relatively adjustable bearing members, bolts for connecting said members together, oppositely disposed resilient elements interposed between said bearing members permanently tending to separate said members, sectional nuts fitted upon said bolts and each of said nuts having one of its sections engaging with its respective bolt to draw the bearing members together and compress said elements, and means mounted in each sectional nut and normally tending to advance that section of the nut engaging with the bolt and further exerting sufficient pressure thereon to overcome the tension of the shims.

5. An adjustable bearing comprising relatively movable bearing parts, bolts connecting said parts, oppositely disposed resilient elements interposed between said parts and permanently tending to separate the same, sectional nuts fitted on said bolts and each including a fixed and a shiftable section, and means mounted in each of the nuts and connected to the sections thereof for normally tending to advance said shiftable section to draw the bearing parts together.

In testimony whereof, I affix my signature hereto.

E. E. JOHNS.